United States Patent [19]

Liesener et al.

[11] Patent Number: 5,682,792
[45] Date of Patent: Nov. 4, 1997

[54] DEPENDENT LATCHING SYSTEM FOR A TRANSMISSION

[75] Inventors: Kenneth P. Liesener, Peoria, Ill.; Kenneth F. Golan, deceased, late of Pekin, Ill., by Kathleen M. Golan, executrix

[73] Assignee: Caterpillar Inc., Peoria, Ill.

[21] Appl. No.: 671,882

[22] Filed: Jun. 28, 1996

[51] Int. Cl.$^6$ ............................................. B60K 41/28
[52] U.S. Cl. ........................... 74/335; 477/906; 477/155
[58] Field of Search ............................ 74/335, 336 R; 477/70, 155, 160, 906

[56] References Cited

U.S. PATENT DOCUMENTS

| | | | |
|---|---|---|---|
| 4,827,806 | 5/1989 | Long et al. | 74/869 |
| 4,838,298 | 6/1989 | Cleasby | 137/110 |
| 4,843,902 | 7/1989 | Patton et al. | 74/335 |
| 5,044,216 | 9/1991 | Steeby et al. | 74/335 |
| 5,063,813 | 11/1991 | Lentz | 74/866 |
| 5,129,274 | 7/1992 | Vukovich et al. | 74/335 |
| 5,138,838 | 8/1992 | Crosser | 60/433 |
| 5,222,581 | 6/1993 | Paulsen | 192/3.58 |
| 5,431,608 | 7/1995 | Hirose | 477/155 X |
| 5,433,124 | 7/1995 | Person | 74/335 |
| 5,438,887 | 8/1995 | Simmons | 74/335 |
| 5,528,949 | 6/1996 | Stainton et al. | 74/336 R X |
| 5,577,974 | 11/1996 | Bertsche et al. | 477/155 X |

FOREIGN PATENT DOCUMENTS 2 258 278   2/1993   United Kingdom.

Primary Examiner—Charles A. Marmor
Assistant Examiner—Peter T. Kwon
Attorney, Agent, or Firm—J. W. Burrows

[57] ABSTRACT

In machines such as hauling units having electro-hydraulic transmission controls, it is desirable to ensure that in the event of an electrical malfunction or power failure the transmission remains in one of its gear ratios. In the subject invention, a dependent latching system is provided in a transmission which in the event of an electrical malfunction latches the transmission in the existing gear ratio or a gear ratio within at least two gears ratios. This is accomplished by providing a master latch valve mechanism, a logic valve arrangement, and a latching shuttle valve to act in cooperation with an electrically controlled proportional valve and a hydraulic proportional valve that controls engagement of a plurality of hydraulically actuated clutches. The master latch valve mechanism directs pressurized fluid from a source of pressurized fluid through the logic valve to urge the latching shuttle valve to an open position. In the event of an electrical malfunction, the logic valve arrangement functions to sense the engaged hydraulically actuated clutches and controls the flow of pressurized fluid to respective ones of the latching shuttle valves to maintain the transmission in one of its operative gears.

19 Claims, 4 Drawing Sheets

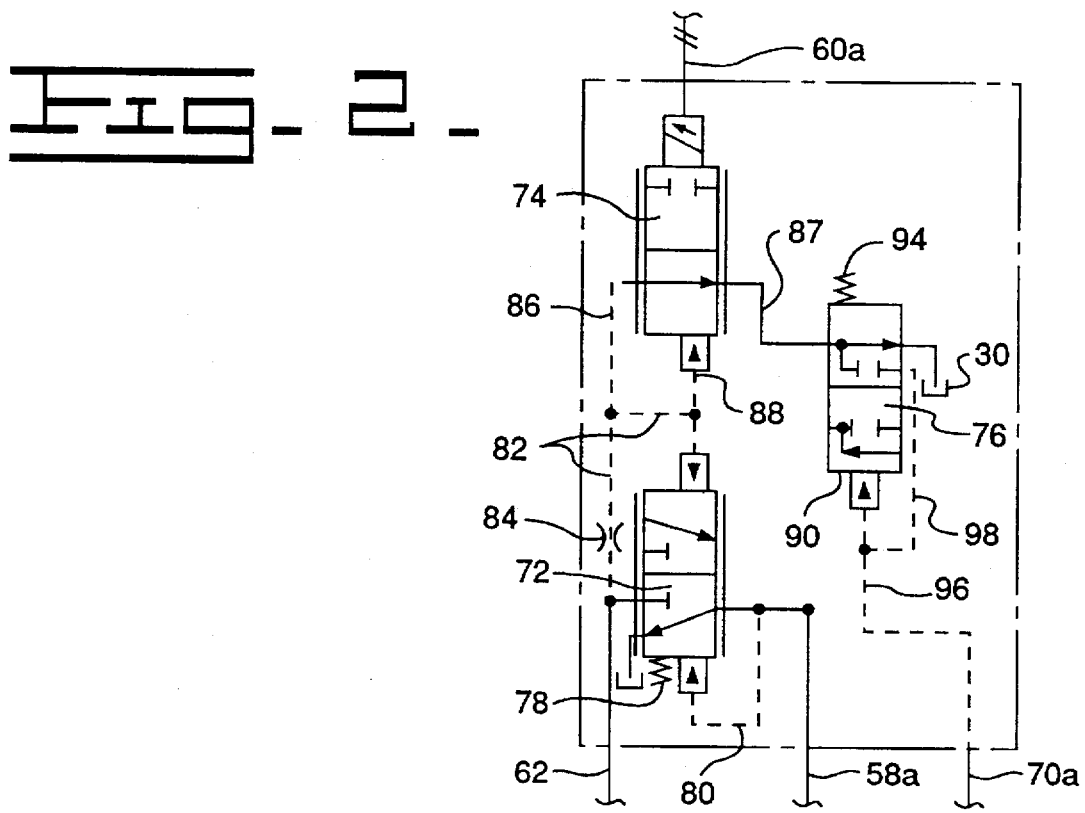
Fig-2-
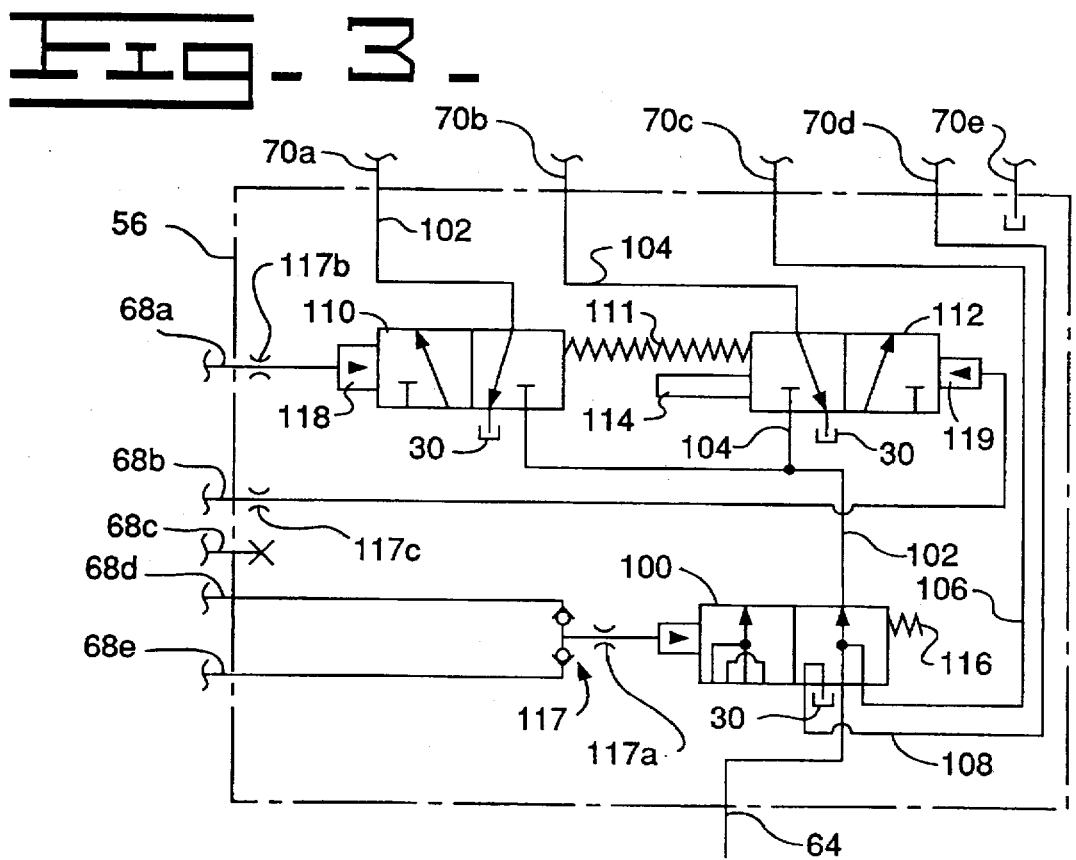
Fig-3-

Fig_4_

| ORIGINAL GEAR | ENGAGED CLUTCHES | DEFAULT GEAR |
|---|---|---|
| N | 5 | N (4) |
| R | 3, 5 | N (4) |
| 1 | 1, 5 | 2 |
| 2 | 1, 4 | 2 |
| 3 | 1, 3 | 3 |
| 4 | 1, 2 | 3 |
| 5 | 2, 3 | 5 |
| 6 | 2, 4 | 6 |

Fig_6_

| ORIGINAL GEAR | ENGAGED CLUTCHES | DEFAULT GEAR |
|---|---|---|
| N | 5 | N |
| R | 3, 5 | R |
| 1 | 1, 5 | 1 |
| 2 | 1, 4 | 2 |
| 3 | 1, 3 | 3 |
| 4 | 1, 2 | 3 |
| 5 | 2, 3 | 5 |
| 6 | 2, 4 | 6 |

DEPENDENT LATCHING SYSTEM FOR A TRANSMISSION

TECHNICAL FIELD

This invention relates generally to a control system for use in a transmission having hydraulically actuated clutches and more particularly to a dependent latching system to latch specific ones of the hydraulically actuated clutches in their engaged positions in an event of an electrical malfunction.

BACKGROUND ART

In some machines used today, it is beneficial to keep the transmission in a predetermined gear in the event of an electrical malfunction or power failure. At least one hydraulic arrangement is known at which a source of pressurized fluid is latched and unlatched at different pressure levels. It is well known to proportionally control the engagement of hydraulically actuated clutches by directing an electrical signal from a microprocessor to an electro-hydraulic proportional valve. Various other arrangements are known which use hydraulic valves in combination with electrically controlled solenoids to maintain fluid actuators in their engaged position in the event of an electrical system failure. Many of these known arrangements are complicated and use many different components and/or specialized components. It is desirable to provide a dependent latching system that is simple in construction and effective to maintain a machine in a predetermined gear ratio in the event there is an electrical malfunction or failure in the electrical system.

The present invention is directed to overcoming one or more of the problems as set forth above.

DISCLOSURE OF THE INVENTION

On one aspect of the present invention, a dependent latching system is provided and adapted for use in a control system for a transmission having a plurality of hydraulically actuated clutches. The control system includes a source of pressurized fluid connected to a reservoir and an electronic controller connected to a source of electrical energy. The control system is operative to receive signals from various system parameters and to direct control signals therefrom. The electronic controller is operative in response to a command input mechanism to selectively control engagement of respective ones of the hydraulically actuated clutches in the transmission. The dependent latching system comprises a plurality of electro-hydraulic valve mechanisms connected to the electronic controller and to respective ones of the hydraulically actuated clutches and each being operative in response to receipt of an electrical signal from the electronic controller to proportionally control engagement of the respective hydraulically actuated clutches. Each of the electro-hydraulic valve mechanisms includes a proportional valve connected between the source of pressurized fluid and the respective hydraulically actuated clutch, an electrically controlled proportional valve operatively connected to the electronic controller and the proportional valve, and a latching shuttle valve having one end and a spring end and is disposed between the electrically controlled proportional valve and the reservoir. The latching shuttle valve is movable against the bias of the spring in response to receipt of a pressure signal at the one end thereof. A master latch valve mechanism is connected between the source of pressurized fluid and the one end of the latching shuttle valve. A logic valve arrangement is operatively connected between the master latch valve mechanism and at least various ones of the plurality of electro-hydraulic valve mechanisms and in respective communication with at least various ones of the plurality of hydraulically actuated clutches.

BRIEF DESCRIPTION OF THE DRAWINGS

FIG. 2 is a schematic representation of a portion of FIG. 1 that more explicitly illustrates a portion of the present invention;

FIG. 3 is a schematic representation of another portion of FIG. 1 that more explicitly illustrates another portion of the present invention;

FIG. 4 is a table representing one set of gear ratios for the transmission and the gear ratio that the transmission defaults to in the event of an electrical malfunction;

FIG. 6 is a table representing a set of gear ratios for the transmission and the gear ratio that the transmission defaults to for another embodiment in the event of an electrical malfunction.

BEST MODE FOR CARRYING OUT THE INVENTION

Figure 1:
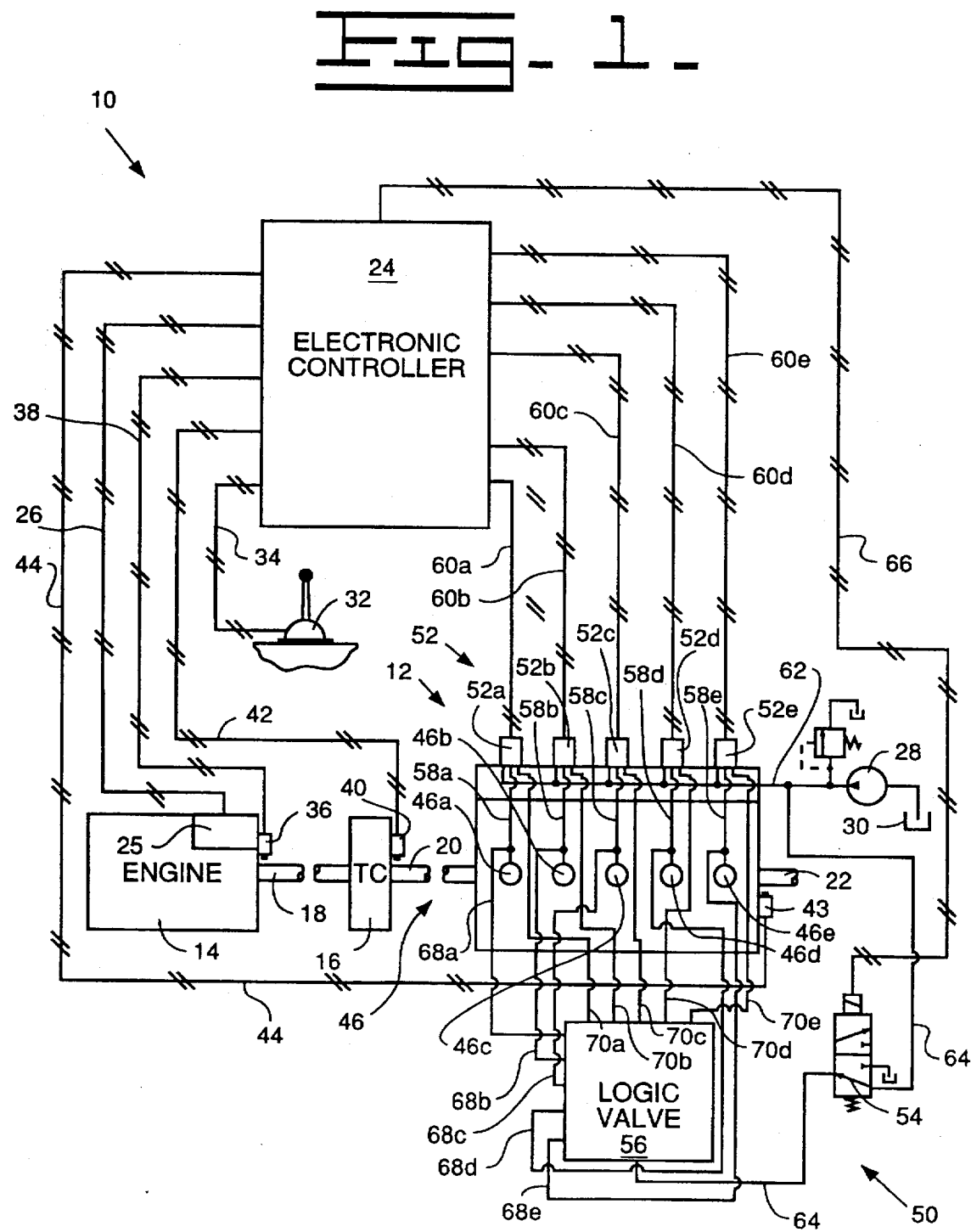
FIG. 1 is a partial diagrammatic and partial schematic representation of a control system for a transmission incorporating an embodiment of the present invention.

Referring to the drawings, and more specifically to FIG. 1, a control system 10 for a transmission 12 is illustrated for use in a machine (not shown) having an engine 14 drivingly connected to a torque converter 16 by a shaft 18 and another shaft 20 drivingly connected between the torque converter 16 and the transmission 12. Output power from the transmission 12 is transmitted therefrom by an output shaft 22.

The control system 10 includes an electronic controller 24, a source of electrical energy 25 connected to the electronic controller 24 by an electrical connection 26, a source of pressurized fluid 28 which receives fluid from a reservoir 30, and a command input mechanism 32 connected to the electronic controller 24 by an electrical connection 34. A speed sensor 36 is connected to the electronic controller 24 by an electrical connection 38 and is operative to sense the rotational speed of the shaft 18. A speed sensor 40 is connected to the electronic controller 24 by an electrical connection 42 and is operative to sense the rotational speed of the shaft 20. A speed sensor 43 is connected to the electronic controller 24 by an electrical connection 44 and is operative to sense the rotational speed of the output shaft 22.

The transmission 12 has a plurality of hydraulically actuated clutches 46. In the subject arrangement, the plurality of hydraulically actuated clutches 46 includes respective hydraulically actuated clutches 46a–e.

A dependent latching system 50 is provided and includes a plurality of electro-hydraulic valve mechanisms 52, a master latch valve mechanism 54, and a logic valve arrangement 56. The plurality of electro-hydraulic valve mechanisms 52 includes respective electro-hydraulic valve mechanisms 52a–e each respectively connected to respective ones of the hydraulically actuated clutches 46a–e by respective conduits 58a–e. The electronic controller 24 generates electrical control signals representative of the desired input from the command input mechanism 32 and delivers the electrical control signals through respective electrical connections 60a–e to the respective electro-hydraulic valve mechanisms 52a–e.

A conduit 62 connects each of the plurality of electro-hydraulic valve mechanism 52 with the source of pressurized fluid 28. The master latch valve mechanism 54 is disposed in a conduit 64 between the source of pressurized fluid 28 and the logic valve arrangement 56.

The master latch valve mechanism 54 is a two position valve that is spring biased to its first position and movable to its second position in response to receipt of an electrical signal from the electronic controller 24 through an electrical connection 66. In the first position of the master latch valve mechanism 54, the source of pressurized fluid 28 is in communication therethrough with the logic valve arrangement 56 and in the second position thereof the flow of pressurized fluid 28 therethrough is blocked and the portion of the conduit 64 from the logic valve arrangement 56 is in communication with the reservoir 30.

Respective conduits 68a–e connect each of the respective hydraulically actuated clutches 46a–e with the logic valve arrangement 56 and respective conduits 70a–e connect the logic valve arrangement 56 with each of the respective electro-hydraulic valve mechanisms 52a–e.

Referring to FIG. 2, one electro-hydraulic valve mechanism 52a of the plurality of electro-hydraulic valve mechanisms 52 is illustrated in greater detail. Since all of the plurality of electro-hydraulic valve mechanisms 52 are the same, only the one electro-hydraulic valve mechanism 52a and its associated hydraulically actuated clutch 46a will be described in detail. The one electro-hydraulic valve mechanism 52a includes a proportional valve 72 operatively connected between the source of pressurized fluid 28 and the hydraulically actuated clutch 46a by the conduits 62,58a, an electrically controlled proportional valve 74 operatively connected to the electronic controller 24 and the proportional valve 72, and a latching shuttle valve 76 disposed between the electrically controlled proportional valve 74 and the reservoir 30. The proportional valve 72 is an infinitely variable two position valve that is spring biased by a spring 78 towards a first position at which the flow of fluid from the source of pressurized fluid 28 is blocked and the hydraulically actuated clutch 46a is in communication with the reservoir 30 and proportionally movable towards a second position at which the source of pressurized fluid 28 is in communication with the hydraulically actuated clutch 46a through the conduits 62,58a. A pilot conduit 80 connects the conduit 58a to one end of the proportional valve 72 which acts in conjunction with the spring 78 to urge the proportional valve 72 towards its first position. A pilot conduit 82 having a flow restricting orifice 84 therein connects the pressurized fluid in the conduit 62 to the other end of the proportional valve 72 to urge it towards its second position.

The electrically controlled proportional valve 74 is disposed between the pilot conduit 82 of the proportional valve 72 and the latching shuttle valve 76 by respective pilot conduits 86,87. The electrical connection 60a connects one end of the electrically controlled proportional valve 74 to the electronic controller 24 and a conduit 88 connects the other end thereof to the other end of the proportional valve 72 through the conduit 82. The electrically controlled proportional valve 74 is an infinitely variable two position valve proportionally movable towards its first position in response to pressurized fluid in the conduit 88 and proportionally movable towards its second position in response to receipt of the electrical signal from the electronic controller 24. In the first position of the electrically controlled proportional valve 74, the conduit 86 is in communication with the conduit 87 and in the second position thereof, the conduit 86 is blocked from communication with the conduit 87.

The latching shuttle valve 76 is a two position valve that is spring biased to a first position by a spring 94. One end 90, opposed to the spring end, is connected to the logic valve 56 by a conduit 96 and the conduit 70a. A pilot conduit 98 selectively connects the conduit 96 with the conduit 87. In the first position of the latching shuttle valve 76, the conduit 87 is open to the reservoir 30 and the pilot conduit 98 is blocked from the conduit 87. In the second position thereof, the conduit 87 is blocked from communication with the reservoir 30 and the pilot conduit 98 is in communication with the conduit 87. It is recognized that the control system would still function without the use of the pilot conduit 98 without departing from the essence of the invention.

Referring to FIG. 3, the logic valve arrangement 56 is illustrated in greater detail and includes a first logic valve 100 that is disposed between the source of pressurized fluid 28 and the respective one end 90 of the respective latching shuttle valve 76 of each of the electro-hydraulic valve mechanisms 52a,52b,52c,52d,52e. In the subject arrangement, the one end 90 of the latching shuttle valve 76 of the electro-hydraulic valve mechanisms 52e is open to the reservoir and totally disconnected from the source of pressurized fluid 28. A conduit 102 connects the first logic valve 100 to the electro-hydraulic valve mechanisms 52a through the conduit 70a and a conduit 104 and a portion of conduit 102 connects the first logic valve 100 to the electro-hydraulic valve mechanisms 52b. A conduit 106 connects the first logic valve 100 to the electro-hydraulic valve mechanisms 52c and a conduit 108 connects the first logic valve 100 to the electro-hydraulic valve mechanisms 52d.

A second logic valve 110 is disposed in the conduit 102 and a third logic valve 112 is disposed in the conduit 104. The second logic valve 110 is spring biased to a first position by a spring 111 at which communication from the first logic valve 100 to the electro-hydraulic valve mechanisms 52a through the conduit 70a is blocked and the conduit 70a is open to the reservoir 30 and a second position at which communication from the first logic valve 100 to the conduit 70a is open. The third logic valve 112 is spring biased to a first position by the spring 111 at which communication from the first logic valve 100 to the electro-hydraulic valve mechanisms 52b through the conduit 70b is blocked and the conduit 70b is open to the reservoir 30 and a second position at which communication from the first logic valve 100 to the conduit 70b is open.

An interlock mechanism 114 is disposed between the second and third logic valves 110,112 and operative to maintain the third logic valve 112 in its first position when the second logic valve 110 is in its second position and to maintain the second logic valve 110 in its first position when the third logic valve 112 is in its second position.

The first logic valve 100 is spring biased to a first position by a spring 116 at which the source of pressurized fluid 28 is in communication with the second and third logic valves 110,112 and the electro-hydraulic valve mechanisms 52c through the conduits 106,70c and the electro-hydraulic valve mechanisms 52d is in communication with the reservoir 30 through the conduits 70d,108. The first logic valve 100 is movable towards a second position at which the source of pressurized fluid 28 remains in communication with the second and third logic valves 110,112 and communicates with the electro-hydraulic valve mechanism 52d through the conduits 108 and 70d and the electro-hydraulic valve mechanisms 52c is in communication with the reservoir 30 through the conduits 70c,106.

The first logic valve 100 is movable towards its second position in response to receipt of pressurized fluid from one of the hydraulically actuated clutches 46d,46e through the respective conduits 68d,68e, a resolver valve 117 and a flow delaying orifice 117a. The second logic valve 110 is movable towards its second position in response to receipt of pressurized fluid from the hydraulically actuated clutch 46a through the conduit 68a and a flow delaying orifice 117b to a pressure chamber 118. The third logic valve 112 is movable towards its second position in response to receipt of pressurized fluid from the hydraulically actuated clutch 46b through the conduit 68b and a flow delaying orifice 117c to a pressure chamber 119. In the subject arrangement, the effective area within the pressure chamber 118 that is subject to the pressurized fluid is larger than the effective area within the pressure chamber 119. Consequently, based on the difference in areas of the pressure chambers 118,119, if both of the pressure chambers 118,119 are subjected to the same pressure at the same time, movement of the second logic valve 110 would have priority over movement of the third logic valve 112.

Referring to FIG. 4, a table is shown illustrating the respective engaged hydraulically actuated clutches for each gear ratio of a six-speed transmission incorporating the embodiment of FIG. 3. The table also indicates the gear that the transmission 12 defaults to in the event of an electrical failure. In the table, the numbers 1–5 relating to the "engaged clutches" respectively represent the respective hydraulically actuated clutches 46a–e. As set forth in the table, the hydraulically actuated clutch 46e is engaged with the transmission 12 in its operational neutral and in the event of an electrical malfunction the transmission 12 defaults to engaging the hydraulically actuated clutch 46d. Even though the default gear ratio of the transmission 12 shown is within one gear ratio of that the transmission 12 was in at the time of the electrical failure, it is recognized that in some arrangements the default gear ratio could be more than one gear ratio therefrom without departing from the essence of the subject invention.

Figure 5:
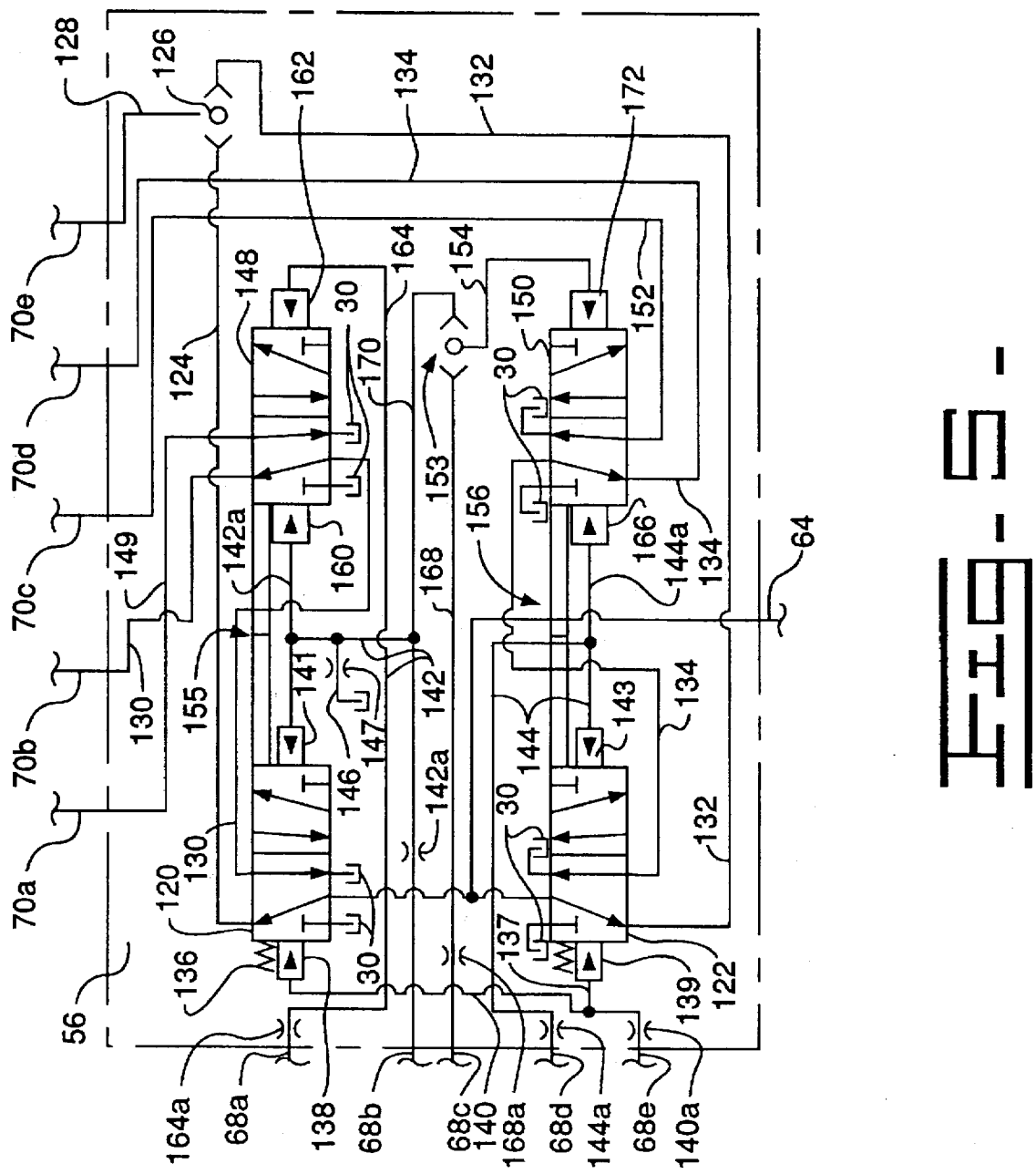
FIG. 5 is a schematic representation of another embodiment of the embodiment illustrated in FIG. 3.

Referring to FIG. 5, another embodiment of the logic valve arrangement 56 is illustrated. The logic valve arrangement 56 of FIG. 5 includes a first logic valve 120 disposed between the source of pressurized fluid 28 and the respective one end 90 of the respective shuttle latching valve 76 of the electro-hydraulic valve mechanisms 52e,52b and a second logic valve 122 disposed between the source of pressurized fluid 28 and the respective one end 90 of the respective shuttle latching valve 76 of the electro-hydraulic valve mechanisms 52e,52d. A conduit 124, a resolver valve 126, and a conduit 128 connects the first logic valve 120 to the electro-hydraulic valve mechanism 52e through the conduit 70e and a conduit 130 connects the first logic valve 120 to the electro-hydraulic valve mechanism 52b through the conduit 70b.

A conduit 132, the resolver valve 126, and the conduit 128 connects the second logic valve 122 with the electro-hydraulic valve mechanism 52e through the conduit 70e and a conduit 134 connects the second logic valve 122 with the electro-hydraulic valve mechanism 52d through the conduit 70d.

The first and second logic valves 120,122 are spring biased to a first position by respective springs 136,137. The spring biased end of each of the first and second logic valves 120,122 has respective pressure chambers 138,139 each connected to the hydraulically actuated clutch 46e through a conduit 140 having a flow delaying orifice 140a disposed therein and the conduit 68e. The force of the pressurized fluid in the hydraulically actuated clutch 46e acts in conjunction with the force of the respective springs 136,137 to urge the first and second logic valves 120,122 to their respective first positions. In the first position of the first logic valve 120, the source of pressurized fluid 28 is in communication with the one end 90 of the latching shuttle valve 76 of the electro-hydraulic valve mechanism 52e through the conduit 124, the resolver valve 126, the conduit 128 and the conduit 70e and the one end 90 of the latching shuttle valve 76 of the electro-hydraulic valve mechanism 52b is in communication with the reservoir 30 through the conduits 70b,130. The first logic valve 120 is movable towards a second position at which the electro-hydraulic valve mechanism 52b is in communication with the source of pressurized fluid 28 and the electro-hydraulic valve mechanism 52e is in communication with the reservoir 28.

In the first position of the second logic valve 122, the source of pressurized fluid 28 is in communication with the one end 90 of the latching shuttle valve 76 of the electro-hydraulic valve mechanism 52e through the conduit 132, the resolver valve 126, the conduit 128 and the conduit 70e and the one end 90 of the latching shuttle valve 76 of the electro-hydraulic valve mechanism 52d is in communication with the reservoir 30 through the conduits 70d,134. The second logic valve 122 is movable towards a second position at which the electro-hydraulic valve mechanism 52d is in communication with the source of pressurized fluid 28 and the electro-hydraulic valve mechanism 52e is in communication with the reservoir 30.

The first logic valve 120 is movable towards its second position in response to pressurized fluid in the hydraulically actuated clutch 46b being directed to a pressure chamber 141 through the conduit 68b, and a conduit 142 having a flow delaying orifice 142a disposed therein. The second logic valve 122 is movable towards its second position in response to pressurized fluid in the hydraulically actuated clutch 46d being directed to a pressure chamber 143 through the conduit 68d and a conduit 144 having a flow delaying orifice 144a disposed therein. A conduit 146 is connected between the conduit 142 downstream of the flow restricting orifice 142a and the reservoir 30 and has a flow restricting orifice 147 disposed therein.

A third logic valve 148 is disposed in the conduit 130 between the first logic valve 120 and the one end 90 of the latching shuttle valve 76 of the electro-hydraulic valve mechanisms 52b. A conduit 149 and the conduit 70a connects the third logic valve 148 with the one end 90 of the latching shuttle valve 76 of the electro-hydraulic valve mechanism 52a. The third logic valve 148 is movable between first and second positions. In the first position of the third logic valve 148, fluid flow from the first logic valve 120 is in communication with the electro-hydraulic valve mechanism 52b through the conduits 130,70b and the electro-hydraulic valve mechanism 52a is in communication with the reservoir 30 through the conduits 70a,149. In the second position thereof, fluid flow from the first logic valve 120 is in communication with the electro-hydraulic valve mechanism 52a through the conduits 149,70a, and a portion of conduit 130 and the electro-hydraulic valve mechanism 52b is in communication with the reservoir 30 through the conduits 70b and a portion of the conduit 130.

The third logic valve 148 is movable towards its first position in response to pressurized fluid in the hydraulically actuated clutch 46b being directed to a pressure chamber 160 through the conduits 68b,142 and a conduit 142a that is connected to the conduit 142 downstream of the flow restricting orifice 145. The third logic valve 148 is movable towards its second position in response to pressurized fluid in the hydraulically actuated clutch 46a being directed to a pressure chamber 162 through the conduit 68a and a conduit 164 having a flow delaying orifice 164a disposed therein.

A fourth logic valve 150 is disposed in the conduit 134 between the second logic valve 122 and the one end 90 of the respective shuttle latching valve 76 of the electro-hydraulic valve mechanisms 52d. A conduit 152 and the conduit 70c connects the fourth logic valve 150 with the one end 90 of the latching shuttle valve 76 of the electro-hydraulic valve mechanism 52c. The fourth logic valve 150 is movable between first and second positions. In the first position, fluid flow from the second logic valve 122 is in communication with the electro-hydraulic valve mechanism 52d through the conduits 70d,134 and the electro-hydraulic valve mechanism 52c is in communication with the reservoir 30 through the conduits 70c,152. In the second position, fluid flow from the second logic valve 122 is in communication with the electro-hydraulic valve mechanism 52c through the conduits 152,70c, and a portion of conduit 134 and the electro-hydraulic valve mechanism 52d is in communication with the reservoir 30 through the conduit 70d and a portion of the conduit 134.

The fourth logic valve 150 is movable towards its first position in response to pressurized fluid being directed from the hydraulically actuated clutch 46d through the conduits 68d,144 and a conduit 144a to a pressure chamber 166. The fourth logic valve 150 is movable towards its second position in response to pressurized fluid being directed from one of the hydraulically actuated clutches 46b,46c through the respective ones of the conduits 68b,68c, the conduit 142, a conduit 168 having a flow delaying orifice 168a disposed therein connected to the conduit 68c, a conduit 170 connected to the conduit 142 downstream of the flow restricting orifice 142a, a resolver valve 153, and a conduit 154 to a pressure chamber 172.

In the subject arrangement, the effective areas within the pressure chambers 138,141 of the first logic valve 120 that is subjected to the pressurized fluid is smaller than the effective areas within the pressure chambers 160,162 of the third logic valve 148. In the event that the same level of pressurized fluid is available to both of the pressure chambers 138 and 162 at the same time, movement of the third logic valve 148 would have priority over movement of the first logic valve 120. Likewise, the effective areas within the pressure chambers 139,143 of the second logic valve 122 is smaller than the effective areas within the pressure chambers 166,172 of the fourth logic valve 150 so that movement of the fourth logic valve 150 would have priority over movement of the second logic valve 122 in the event that the pressure chamber 139 of the second logic valve 122 was subjected to the same pressure as that in the pressure chamber 172 of the fourth logic valve 150.

A first interlock mechanism 155 is disposed between the first and third logic valves 120,148 and operative to maintain the third logic valve 148 in its first position when the first logic valve 120 is in its first position and to maintain the first logic valve 120 in its second position when the third logic valve 148 is in its second position.

A second interlock mechanism 156 is disposed between the second and fourth logic valves 122,150 and operative to maintain the fourth logic valve 150 in its first position when the second logic valve 122 is in its first position and to maintain the second logic valve 122 in its second position when the fourth logic valve 150 is in its second position.

Referring to FIG. 6, a table is shown illustrating the respective engaged hydraulically actuated clutches for each gear ratio of a six-speed transmission incorporating the embodiment of FIG. 5 and the gear ratio that the transmission 12 default to in the event of an electrical failure. In the table, the numbers 1–5 relating to the "engaged clutches" respectively represent the respective hydraulically actuated clutches 46a–e. Even though the default gear ratio of the transmission 12 shown is within one gear ratio of that the transmission 12 was in at the time of the electrical failure, it is recognized that in some arrangements the default gear ratio could be more than one gear ratio away without departing from the essence of the subject invention.

It is recognized that various forms of the subject invention could be utilized without departing from the essence of the subject invention. For example, the plurality of hydraulically actuated clutches 46 could vary in number depending on the number of gear ratios desired in the system. Likewise, other system parameters could be sensed, such as an intermediate speed sensor in the transmission, and directed to the electronic controller 24 in order to provide a more finite control of the transmission 12 with respect to other components of the machine system. In FIGS. 1 and 3 the conduits 68c and 70e are illustrated, but it is recognized that these conduits are not needed in the subject embodiment. It is also recognized that the latching shuttle valve 76 of the electro-hydraulic valve mechanism 52e is not required in the embodiment of the logic valve mechanism 56 illustrated in FIG. 3.

INDUSTRIAL APPLICABILITY

In the operation of the subject dependent latching system 50 as generally illustrated in FIG. 1 and more specifically illustrated in FIGS. 2–4, the electronic controller 24 continuously monitors the rotational speed of the shafts 18,20, and 22 through the associated speed sensors 36,40 and 43. Once the machine is turned on, the electronic controller 24 directs an electrical signal to the master latch valve mechanism 54 moving it to its second position at which the source of pressurized fluid 28 is blocked from the logic valve arrangement 56 and the fluid in the conduit 64 is connected to the reservoir 30. As illustrated in FIG. 4, with the transmission 12 in neutral, only the hydraulically actuated clutch 46e is engaged. Since the transmission 12 requires the engagement of two of the hydraulically actuated clutch in order to provide output torque to the output shaft 22, the machine will not move with only the hydraulically actuated clutch 46e engaged. The hydraulically actuated clutch 46e is engaged by an electrical signal being directed to the electrically controlled proportional valve 74 in a conventional manner to control the position of the proportional valve 72 thus maintaining the hydraulically actuated clutch 46e engaged. Since, as shown in FIG. 2, the one end 90 of the latching shuttle valve 76 of the electro-hydraulic valve mechanism 52e is not available to the source of pressurized fluid 28, operation of the master latch valve mechanism 54 does not affect the position of the latching shuttle valve 76 of the electro-hydraulic valve mechanism 52e.

When it is desired to shift the transmission 12 into one of its operative speed ratios, it is necessary to engage two of the plurality of hydraulically actuated clutches 46. The command input mechanism 32 is moved by the operator to one of its operative positions which directs an electrical signal through the electrical connection 34 to the electronic controller 24. The electronic controller 24 subsequently directs the appropriate output electrical signals through the respective electrical connections 60a–e to the respective electro-hydraulic valve mechanisms 52a–e to engage the appropriate ones of the plurality of hydraulically actuated clutches 46.

In the subject arrangement, with the five different hydraulically actuated clutches 46a–e, six different speed ratios are obtained. It is recognized that other speed ratios can be obtained with the same number of hydraulically actuated clutches or with more or less number of hydraulically actuated clutches.

The following table illustrates an example of the speed ratios or gears obtainable in the subject transmission 12. In the table, the numbers 1–5 representing the "clutches engaged" respectively represent the respective hydraulically actuated clutches 46a–e.

| GEAR | CLUTCHES ENGAGED |
|---|---|
| N | 5 |
| R | 3,5 |
| 1 | 1,5 |
| 2 | 1,4 |
| 3 | 1,3 |
| 4 | 1,2 |
| 5 | 2,3 |
| 6 | 2,4 |

If the input to the command input mechanism 32 requires that the transmission 12 be in its 1st gear ratio, then the electronic controller 24 directs electrical signals to the appropriate electro-hydraulic valve mechanisms to engage the respective hydraulically actuated clutches. When shifting from the neutral gear ratio to the first gear ratio, it is only necessary to engage the hydraulically actuated clutches 46a since the hydraulically actuated clutches 46e is already engaged. The engagement of the hydraulically actuated clutch 46a is proportionally controlled by the respective electro-hydraulic valve mechanism 52a. The electrical signal from the electronic controller 24 act on the electrically controlled proportional valve 74 to move the electrically controlled proportional valve 74 towards its second position. As the electrically controlled proportional valve 74 moves towards its second position, the proportional valve 72 moves towards its second position thus interconnecting the source of pressurized fluid 28 with the hydraulically actuated clutches 46a in direct proportion to the magnitude of the electrical signal. Once both of the hydraulically actuated clutches 46a,46e are engaged, the transmission 12 is in its first gear. The fluid flow being directed across the respective electrically controlled proportional valves 74 is directed to the reservoir 30 across the latching shuttle valve 76 as illustrated in FIG. 3.

If it is desired to shift to another gear, such as fifth gear, the operator makes the desired selection to the command input mechanism 32. The electronic controller 24 subsequently directs the appropriate electrical signals to the appropriate electro-hydraulic valve mechanisms 52b,52c which act to engage the hydraulically actuated clutches 46b,46c thus placing the transmission 14 in its fifth gear. Simultaneously, the hydraulically actuated clutches 46a,46e are disengaged just prior to and in overlapping relationship with the engagement of the hydraulically actuated clutches 46b,46c.

During normal operation, the transmission 12 can be placed in any of the gear ratios noted in the table above by engaging the appropriate hydraulically actuated clutches 46a–e as noted in the table.

In the event of an electrical malfunction in the electrical system with the transmission 12 being operated in one of its operative gear ratios, it is desired to ensure that the transmission 12 remains in the engaged gear ratio or a closely related gear ratio. In the subject arrangement, upon an electrical malfunction, the transmission 12 defaults to the gear ratio that it is in or going into at the time the electrical malfunction occurs or to one of the adjacent gear ratios.

This is accomplished in the following manner. With no electrical energy, the master latch valve mechanism 54 moves to its first spring biased position connect the source of pressurized fluid 28 with the conduit 64 thus directing pressurized fluid to the logic valve arrangement 56.

In the operation of the embodiment of FIG. 3 and using the table of FIG. 4, if, for example, with the transmission 12 in its second gear ratio, the hydraulically actuated clutches 46a and 46d are engaged and the master latch valve mechanism 54 is in its second position blocking the source of pressurized fluid 28 from the logic valve arrangement 56. With the hydraulically actuated clutches 46a and 46d engaged, the first logic valve 100 is moved to its second position in response to the pressurized fluid directed thereto through the conduit 68d and the second logic valve 110 is moved to its second position in response to the pressurized fluid directed to the pressure chamber 118 through the conduit 68a. With the second logic valve 110 in its second position, the third logic valve 112 is maintained in its first position by the interlock mechanism 114. Additionally, if both of the pressure chambers 118,119 are subjected to the same pressure at the same time, the larger effective area in the pressure chamber 118 provides priority to movement of the second logic valve 110. In the event of an electrical failure, the master latch valve mechanism 54 is spring biased to its first position to direct pressurized fluid to the logic valve arrangement 56 through the conduit 64. With the first and second logic valves 100,110 in their respective second positions, the pressurized fluid is directed to the respective one end 90 of each of the electro-hydraulic valve mechanisms 52a,52d to move the respective latching shuttle valves 76 to their second positions to block the conduit 87 from the reservoir 30 and connect the respective pilot conduits 98 to the respective conduits 87. Since fluid flow in the respective conduits 82 must be vented to the reservoir 30 in order for the respective proportional valves 72 to move to their first positions to release the respective hydraulically actuated clutches 46a,46d, the respective proportional valves 72 cannot move to their respective first positions. In order to further enhance the latching stability, the pressurized fluid in the respective pilot conduits 98 is directed across the second positions of the respective latching shuttle valves 76 and the electrically controlled proportional valves 74 to the conduit 82 to further aid in maintaining the respective hydraulically actuated clutches 46a,46d engaged. With the transmission 12 defaulted to the second gear ratio, the machine may be controllable moved to a location in which the electrical problem can be resolved and the system reset.

With the transmission 12 operating in its fifth gear ratio, the hydraulically actuated clutches 46b,46c are engaged and the master latch valve mechanism 54 is in its second position. With the hydraulically actuated clutches 46b,46c engaged, the first logic valve 100 remains in its first, spring biased position and the third logic valve 112 is moved to its second position in response to pressurized fluid from the hydraulically actuated clutch 46b being directed to the pressure chamber 119. In the event of an electrical malfunction, the master latch valve mechanism 54 is spring biased to its first position to direct pressurized fluid to the logic valve arrangement 56. The pressurized fluid is simultaneously directed across the first logic valve 100 to the one end 90 of the latching shuttle valve 76 of the electro-hydraulic valve mechanism 52c and across the third logic valve 112 to the one end 90 of the latching shuttle valve 76 of the electro-hydraulic valve mechanism 52b. As set forth above, with the respective latching shuttle valves 76 moved to their respective second positions, the respective hydraulically actuated clutches 46b,46c are maintained engaged and the transmission 12 remains in its fifth gear ratio until the electrical malfunction is fixed.

When the transmission 12 is being operated in any of its second, third, fifth or sixth gear ratios, the transmission 12 will default to the gear that it was in at the time of the electrical failure. When the transmission 12 is being operated in one of its reverse, first, or fourth gear ratios, the transmission will default to an adjacent gear ratio in the event of an electrical malfunction.

With the transmission in its first gear ratio, the hydraulically actuated clutches 46a,46e are engaged and the master latch valve mechanism 54 is in its second position. With the hydraulically actuated clutches 46a,46e engaged, the first logic valve 100 is moved to its second position in response to pressurized fluid in the hydraulically actuated clutch 46e being directed thereto through the conduit 68e and the resolver valve 117 and the second logic valve 110 is moved to its second position in response to receipt of pressurized fluid from the hydraulically actuated clutch 46a being directed to the pressure chamber 118 through the conduit 68a. In the event of an electrical malfunction, the master latch valve mechanism 54 is spring biased to its first position to direct pressurized fluid to the logic valve arrangement 56. The pressurized fluid is simultaneously directed across the first logic valve 100 to the one end 90 of the latching shuttle valve 76 of the electro-hydraulic valve mechanism 52d and across the second logic valve 110 to the one end 90 of the latching shuttle valve 76 of the electro-hydraulic valve mechanism 52a. As set forth above, with the latching shuttle valve 76 of the electro-hydraulic valve mechanism 52a moved to its second position, the hydraulically actuated clutch 46a is maintained engaged. In this situation, the hydraulically actuated clutch 46e is permitted to disengage. However, while the hydraulically actuated clutch 46e is being disengaged, the hydraulically actuated clutch 46d is being engaged to maintain the transmission in its fourth gear ratio. Since the pressurized fluid is being directed to the one end 90 of the latching shuttle valve 76 of the electro-hydraulic valve mechanism 52d, the flow path of fluid in the conduits 87,86,82 thereof is blocked. Consequently, the fluid pressure in the conduit 82 increases by the flow of fluid across the flow restricting orifice 84. This increase in pressure in the conduit 82 is effective to move the proportional valve 72 thereof to its second position which results in pressurized fluid being directed to the hydraulically actuated clutch 46d to engage the hydraulically actuated clutch 46d. With both of the hydraulically actuated clutches 46a,46d engaged, the transmission 12 defaults to its second gear ratio until the electrical malfunction is fixed.

The interlock mechanism 114 operates to ensure that the pressurized fluid is prohibited from being directed to the one end 90 of the respective latching shuttle valves 76 of both of the electro-hydraulic valve mechanisms 52a and 52b at the same time.

Each of the delaying orifices 117a,117b,117c is effective to aid in delaying movement of the respective first, second, and third logic valves 100,110,112 from their respective second position to their respective first position. This delay helps assure that the master latch mechanism 54 moves from its second position to its first position faster than the first, second, and third logic valves 100,110,112 moves from their second positions to their first positions. If there is sufficient volume in the respective actuated hydraulically actuated clutches, then the delaying orifices are not needed.

In the operation of the embodiment of FIG. 5 and using the table of FIG. 6, the normal operation of the different gear ratios is the same as that with respect to FIG. 3. However, in the embodiment of FIG. 5, the logic valve mechanism 56 functions in a different manner in order to determine what gear ratio the transmission 12 defaults to in the event of an electrical malfunction. For example, with the transmission 12 operating in its first gear ratio with the hydraulically actuated clutches 46a,46e engaged, the second logic valve 122 is held in its first position in response to the spring 137 and the force of the pressurized fluid from the hydraulically actuated clutch 46e being directed to the pressure chamber 139. The first and third logic valves 120,148 are moved to their second positions in response to the pressurized fluid in the hydraulically actuated clutch 46a being directed to the pressure chamber 162 through the conduits 68a,164. Since the effective area in the pressure chamber 162 is larger than that of the pressure chamber 138, the resulting effective force moves the third logic valve 148 and the first logic valve 120 to their second positions. In the event of an electrical malfunction, the master latch valve mechanism 54 is spring biased to its first position to direct pressurized fluid to the logic valve arrangement 56. The pressurized fluid is directed across the second logic valve 122 to the one end 90 of the latching shuttle valve 76 of the electro-hydraulic valve mechanism 52e and across the first and third logic valves 120,148 to the one end 90 of the latching shuttle valve 76 of the electro-hydraulic valve mechanism 52a. Consequently, as set forth respect to the table illustrated in FIG. 6, the hydraulically actuated clutches 46a,46e remain engaged and the transmission 12 remains in its first gear ratio.

When the transmission 12 is being operated in either of its reverse, first, second, third, fifth, or sixth gear ratios, the logic valve arrangement 56 is operative in the event of an electrical malfunction to maintain the same hydraulically actuated clutches engaged that were engaged when the electrical malfunction occurred.

When the transmission 12 is being operated in its fourth gear ratio, the hydraulically actuated clutches 46a,46b are engaged. With the hydraulically actuated clutches 46a,46b engaged, the first and third logic valves 120,148 are moved to their second positions in response to pressurized fluid in the hydraulically actuated clutch 46a being directed to the pressure chamber 162 of the third logic valve 148. The interlock mechanism 155 is operative to move the first logic valve 120 in response to movement of the third logic valve 148. Likewise, the second and fourth logic valves 122,150 are moved to their second positions in response to pressurized fluid in the hydraulically actuated clutch 46b being directed to the pressure chamber 172 of the fourth logic valve 150. The interlock mechanism 156 is operative to move the second logic valve 122 to its second position in response to movement of the fourth logic valve 150. Even though the pressurized fluid in the pressure chamber 162 is also available to the pressure chamber 160 of the third logic valve 148, the flow restricting orifice 142a and the flow restricting orifice 147 function to ensure that the third logic valve 148 is not moved back to its first position. In the event of an electrical malfunction, the master latch valve mechanism 54 move to its first position to direct pressurized fluid to the logic valve arrangement 56.

The pressurized fluid is directed across the first logic valve 120 and the third logic valve 148 to the one end 90 of the latching shuttle valve 76 of the electro-hydraulic valve mechanism 52a moving the latching shuttle valve 76 thereof to its second position which is effective to maintain the hydraulically actuated clutch 46a in its engaged position. At the same time, the hydraulically actuated clutch 46b is being disengaged since the one end 90 of the latching shuttle valve 76 of the electro-hydraulic valve mechanism 52b is in communication to the reservoir 30 across the third logic valve 148. At the same time and in overlapping relationship with the disengaging of the hydraulically actuated clutch 46b, the hydraulically actuated clutch 46c is being engaged. The hydraulically actuated clutch 46c is being engaged because the pressurized fluid from the master latch valve mechanism 54 is being directed across the second logic valve 122 and the fourth logic valve 150 to the one end 90 of the latching shuttle valve of the electro-hydraulic valve mechanism 52c. As noted above with respect to the latching circuit of FIG. 3, movement of the latching shuttle valve 76 thereof to its second blocking position is effective to engage and maintain engaged the hydraulically actuated clutch 46c.

As noted above with respect to the delaying orifices 117a,b,c of the latching circuit of FIG. 3, the delaying orifices 140a,142a,144a,164a,168a of FIG. 5 function in the same manner to ensure that the master latch valve mechanism 54 moves from its second position to its first position prior to the respective logic valves 120,122,148,150 moving from their second positions to their first positions.

In view of the foregoing, it is readily apparent that the dependent latching system 50 herein is a reliable and simple arrangement to ensure that upon an electrical malfunction in the control system 10, the transmission 12 will remain in the same gear ratio that it was in or a closely related gear ratio.

Other aspects, objects and advantages of the invention can be obtained from a study of the drawings, the disclosure and the appended claims.

It is claimed:

1. A dependent latching system adapted for use in a control system for a transmission having a plurality of hydraulically actuated clutches, the control system includes a source of pressurized fluid connected to a reservoir and an electronic controller connected to a source of electrical energy and operative to receive signals from various system parameters and to direct control signals therefrom, the electronic controller is operative in response to a command input mechanism to selectively control engagement of respective ones of the hydraulically actuated clutches in the transmission, the dependent latching system comprises:

a plurality of electro-hydraulic valve mechanisms connected to the electronic controller and to respective ones of the hydraulically actuated clutches and each being operative in response to receipt of an electrical signal from the electronic controller to proportionally control engagement of the respective hydraulically actuated clutches, each of the electro-hydraulic valve mechanisms includes a proportional valve connected between the source of pressurized fluid and the respective hydraulically actuated clutch, an electrically controlled proportional valve operatively connected to the electronic controller and the proportional valve, and a latching shuttle valve having one end and an opposed spring end and being disposed between the electrically controlled proportional valve and the reservoir, the latching shuttle valve being movable against the bias of a spring in response to receipt of a pressure signal at the one end thereof;

a master latch valve mechanism connected between the source of pressurized fluid and at least various ones of the one end of the respective latching shuttle valves; and a logic valve arrangement operatively connected between the master latch valve mechanism and at least various ones of the plurality of electro-hydraulic valve mechanisms and in respective communication with at least various ones of the plurality of hydraulically actuated clutches.

2. The dependent latching mechanism of claim 1 wherein the latching shuttle valve is a two position valve movable between a first position at which the electrically controlled proportional valve is in communication with the reservoir and a second position at which the electrically controlled proportional valve is blocked from communication with the reservoir.

3. The dependent latching system of claim 2 wherein the plurality of hydraulically actuated clutches includes at least first, second, and third hydraulically actuated clutches and respective first, second, and third electro-hydraulic valve mechanisms and the logic valve arrangement includes a first logic valve connected between the master latch valve mechanism and the other opposed end of the respective latching shuttle valve of the first, second and third electro-hydraulic valve mechanisms, the first logic valve is spring biased to a first position at which fluid flow from the master latch valve mechanism is in communication with the one end of the respective latching shuttle valves of the first and second electro-hydraulic valve mechanisms and the one end of the latching shuttle valve of the third electro-hydraulic valve mechanism is in communication with the reservoir and movable to a second position at which the fluid flow from the master latch valve mechanism is in communication with the one end of the respective latching shuttle valves of the first and third electro-hydraulic valve mechanisms and the one end of the latching shuttle valve of the second electro-hydraulic valve mechanism is in communication with the reservoir.

4. The dependent latching system of claim 3 wherein the first logic valve of the logic valve arrangement is movable towards its second position in response to receipt of pressurized fluid from the third hydraulically actuated clutch.

5. The dependent latching system of claim 4 wherein the plurality of hydraulically actuated clutches further includes fourth and fifth hydraulically actuated clutches and respective fourth and fifth electro-hydraulic valve mechanisms and the logic valve arrangement further includes a second logic valve connected between the first logic valve and the one end of the first electro-hydraulic valve mechanism and a third logic valve connected between the first logic valve and the one end of the fourth electro-hydraulic valve mechanism.

6. The dependent latching system of claim 5 wherein each of the second and third logic valves is spring biased to a first position at which fluid flow from the first logic valve is blocked and the one end of the latching shuttle valve of each of the respective first and fourth electro-hydraulic valve mechanisms is in communication with the reservoir and movable towards a second position at which fluid flow from the first logic valve is in communication with the one end of the latching shuttle valve of each of the respective first and fourth electro-hydraulic valve mechanisms.

7. The dependent latching system of claim 6 wherein the second logic valve is movable towards its second position in response to receipt of pressurized fluid from the first hydraulically actuated clutch and the third logic valve is movable towards its second position in response to receipt of pressurized fluid from the fourth hydraulically actuated clutch.

8. The dependent latching system of claim 7 including an interlock mechanism disposed between the second and third logic valves and operative to maintain the third logic valve in its first position when the second logic valve is in its second position and to maintain the second logic valve in its first position when the third logic valve is in its second position.

9. The dependent latching system of claim 8 wherein the first logic valve is movable towards its second position in response to receipt of pressurized fluid from one of the third and fifth hydraulically actuated clutches.

10. The dependent latching system of claim 9 wherein in the second position of the respective shuttle latching valves, the one end thereof is in communication thereacross with the respective other end of the respective proportional valves.

11. The dependent latching system of claim 2 wherein the plurality of hydraulically actuated clutches includes first, second, and third hydraulically actuated clutches and respective first, second, and third electro-hydraulic valve mechanisms and the logic valve arrangement includes a first logic valve connected between the master latch valve mechanism and the one end of the respective latching shuttle valve of the first and second electro-hydraulic valve mechanisms and a second logic valve connected between the master latch valve mechanism and the one end of the respective latching shuttle valves of the first and third electro-hydraulic valve mechanisms.

12. The dependent latching system of claim 11 wherein the first logic valve is spring biased to a first position at which fluid flow from the master latch valve mechanism is in communication with the one end of the respective latching shuttle valve of the first electro-hydraulic valve mechanism and the one end of the latching shuttle valve of the second electro-hydraulic valve mechanism is in communication with the reservoir and movable toward a second position at which the fluid flow from the master latch valve mechanism is in communication with the one end of the respective latching shuttle valves of the second electro-hydraulic valve mechanism and the one end of the latching shuttle valve of the first electro-hydraulic valve mechanism is in communication with the reservoir, and the second logic valve is spring biased to a first position at which fluid flow from the master latch valve mechanism is in communication with the one end of the respective latching shuttle valve of the first electro-hydraulic valve mechanism and the one end of the latching shuttle valve of the third electro-hydraulic valve mechanism is in communication with the reservoir and movable toward a second position at which the fluid flow from the master latch valve mechanism is in communication with the one end of the respective latching shuttle valve of the third electro-hydraulic valve mechanism and the one end of the latching shuttle valve of the first electro-hydraulic valve mechanism is in communication with the reservoir.

13. The dependent latching system of claim 12 wherein the plurality of hydraulically actuated clutches further includes fourth and fifth hydraulically actuated clutches and respective fourth and fifth electro-hydraulic valve mechanisms and the logic valve arrangement further includes a third logic valve connected between the first logic valve and the one end of the respective latching shuttle valve of the second and fourth electro-hydraulic valve mechanisms and a fourth logic valve connected between the second logic valve and the one end of the respective latching shuttle valve of the third and fifth electro-hydraulic valve mechanisms.

14. The dependent latching system of claim 13 wherein the third logic valve is biased to a first position at which fluid flow from the first logic valve is in communication with the one end of the second electro-hydraulic valve mechanism and the one end of the latching shuttle valve of the fourth electro-hydraulic valve mechanism is in communication with the reservoir and movable toward a second position at which the fluid flow from the first logic valve is in communication with the one end of the respective latching shuttle valve of the fourth electro-hydraulic valve mechanism and the one end of the latching shuttle valve of the second electro-hydraulic valve mechanism is in communication with the reservoir, and the fourth logic valve is biased to a first position at which fluid flow from the second logic valve is in communication with the one end of the respective latching shuttle valve of the third electro-hydraulic valve mechanism and the one end of the latching shuttle valve of the fifth electro-hydraulic valve mechanism is in communication with the reservoir and movable toward a second position at which the fluid flow from the second logic valve is in communication with the one end of the respective latching shuttle valve of the fifth electro-hydraulic valve mechanism and the one end of the latching shuttle valve of the third electro-hydraulic valve mechanism is in communication with the reservoir.

15. The dependent latching system of claim 14 wherein the first logic valve is movable towards its second position in response to pressurized fluid in the second hydraulically actuated clutch and the second logic valve is movable towards its second position in response to pressurized fluid in the third hydraulically actuated clutch.

16. The dependent latching system of claim 15 wherein the third logic is movable towards its second position in response to pressurized fluid in the fourth hydraulically actuated clutch and the fourth logic valve is movable towards its second position in response to pressurized fluid in one of the second and fifth hydraulically actuated clutches.

17. The dependent latching system of claim 16 including a first interlock arrangement disposed between the first and third logic valve and operative to maintain the third logic valve in its first position when the first logic valve is in its first position and to maintain the first logic valve in its second position when the third logic valve is in its second position.

18. The dependent latching system of claim 17 including a second interlock arrangement disposed between the second and fourth logic valve and operative to maintain the fourth logic valve in its first position when the second logic valve is in its first position and to maintain the second logic valve in its second position when the fourth logic valve is in its second position.

19. The dependent latching system of claim 18 wherein in the second position of the respective shuttle latching valves, the one end thereof is in communication thereacross with the respective other end of the respective proportional valves.

* * * * *